(12) United States Patent
Prakash et al.

(10) Patent No.: US 11,043,025 B2
(45) Date of Patent: Jun. 22, 2021

(54) ILLUMINATION ESTIMATION FOR CAPTURED VIDEO DATA IN MIXED-REALITY APPLICATIONS

(71) Applicants: Siddhant Prakash, Tempe, AZ (US); Paul Nathan, Scottsdale, AZ (US); Linda Nguyen, Chandler, AZ (US); Robert LiKamWa, Tempe, AZ (US); Alireza Bahremand, Mesa, AZ (US)

(72) Inventors: Siddhant Prakash, Tempe, AZ (US); Paul Nathan, Scottsdale, AZ (US); Linda Nguyen, Chandler, AZ (US); Robert LiKamWa, Tempe, AZ (US); Alireza Bahremand, Mesa, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 16/585,479

(22) Filed: Sep. 27, 2019

(65) Prior Publication Data
US 2020/0105053 A1     Apr. 2, 2020

Related U.S. Application Data

(60) Provisional application No. 62/738,521, filed on Sep. 28, 2018.

(51) Int. Cl.
*G06T 15/50* (2011.01)
*G06T 15/10* (2011.01)
(Continued)

(52) U.S. Cl.
CPC ............ *G06T 15/506* (2013.01); *G06T 15/06* (2013.01); *G06T 15/10* (2013.01); *G06T 19/006* (2013.01); *G06T 2210/21* (2013.01)

(58) Field of Classification Search
CPC ......... G06T 19/00; G06T 17/20; G06T 17/00; G06T 15/10; G06T 15/00; G06T 15/08;
(Continued)

(56) References Cited

U.S. PATENT DOCUMENTS

| 10,049,303 B2 | 8/2018 | Protter et al. |
| 2005/0017968 A1* | 1/2005 | Wurmlin ................ G06T 17/00 345/419 |

(Continued)

OTHER PUBLICATIONS

Banterle, F., et al., "EnvyDepth: An Interface for Recovering Local Natural Illumination from Environment Maps," Pacific Graphics 2013, vol. 32, Issue 7, 2013, The Eurographics Association and John Wiley & Sons Ltd., 10 pages.

(Continued)

*Primary Examiner* — Todd Buttram
(74) *Attorney, Agent, or Firm* — Withrow & Terranova, P.L.L.C.

(57) ABSTRACT

Systems and methods for collaborative illumination estimation for mobile mixed-reality devices are provided. Embodiments described herein compose an illumination estimate using video data capturing an environment which includes a reflective object, such as a light probe. Radiance samples are computed from light reflections from the reflective object, which are then interpolated to compose a realistic estimation of physical lighting of the environment. Robust illumination estimation is provided in a computationally efficient manner, supplying real-time updates to facilitate integration with augmented reality (AR) systems and other image processing applications. The computational efficiency of this approach allows for implementation in lower-resource environments, such as mobile devices. In some examples, multiple devices can collaborate to capture the environment from different viewpoints and enhance realism and fidelity in their illumination estimates.

9 Claims, 9 Drawing Sheets

(51) Int. Cl.
  G06T 15/06 (2011.01)
  G06T 19/00 (2011.01)
(58) Field of Classification Search
  CPC ..... G06T 15/005; G06T 15/40; G06T 15/506; G06T 15/50; G06T 15/60; G06T 15/80; G06T 15/06
  See application file for complete search history.

(56) References Cited

U.S. PATENT DOCUMENTS

| | | | | |
|---|---|---|---|---|
| 2006/0222268 | A1* | 10/2006 | Miyashita | G06T 3/4007 382/300 |
| 2007/0216905 | A1* | 9/2007 | Han | G01N 21/474 356/446 |
| 2007/0273691 | A1* | 11/2007 | Collomb | G06T 15/50 345/427 |
| 2010/0158359 | A1* | 6/2010 | Qiao | H04N 1/54 382/164 |
| 2017/0287196 | A1* | 10/2017 | Raeburn | A63F 13/60 |
| 2020/0160750 | A1 | 5/2020 | LiKamWa et al. | |

OTHER PUBLICATIONS

Debevec, P., "Image-Based Lighting," IEEE Computer Graphics and Applications, vol. 22, Issue 2, Mar./Apr. 2002, IEEE, pp. 26-34.
Debevec, P., "Rendering Synthetic Objects into Real Scenes: Bridging Traditional and Image-based Graphics with Global Illumination and High Dynamic Range Photography," SIGGRAPH 98 Conference Proceedings, 1998, Association for Computing Machinery, Inc., pp. 189-198.
Debevec, P., et al. "A Single-Shot Light Probe," ACM Press ACM SIGGRAPH 2012 Posters, 2012, Los Angeles, California, 1 page.
Feng, Y., et al., "Estimation of Light Source Environment for Illumination Consistency of Augmented Reality," 2008 Congress on Image and Signal Processing, 2008, IEEE, pp. 771-775.
Gardner, M., et al., "Learning to Predict Indoor Illumination from a Single Image," ACM Transactions on Graphics, vol. 36, Issue 6, Article 176, Nov. 2017, Association for Computing Machinery, 14 pages.
Gruber, L., et al., "Efficient and Robust Radiance Transfer for Probeless Photorealistic Augmented Reality," IEEE Virtual Reality 2014, Mar. 29-Apr. 2, 2014, Minneapolis, Minnesota, IEEE, pp. 15-20.
Gruber, L., et al., "Image-Space Illumination for Augmented Reality in Dynamic Environments," IEEE Virtual Reality 2015, Mar. 23-27, 2015, Arles, France, IEEE, pp. 127-134.
Havran, V., et al., "Interactive System for Dynamic Scene Lighting using Captured Video Environment Maps," Eurographics Symposium on Rendering, 2005, The Eurographics Association, 14 pages.
Karsch, K., et al., "Automatic Scene Inference for 3D Object Compositing," ACM Transactions on Graphics, vol. 33, No. 3, Article 32, May 2014, ACM, 15 pages.
Karsch, K., et al., "Rendering Synthetic Objects into Legacy Photographs," ACM Transactions on Graphics, vol. 30, No. 6, Article 157, Dec. 2011, ACM, 12 pages.
Khan, E., et al., "Image-Based Material Editing," ACM Press ACM SIGGRAPH 2006 Papers, 2006, Association for Computing Machinery, Inc., pp. 654-663.
Kholgade, N., et al., "3D Object Manipulation in a Single Photograph using 3D Stock Models," ACM Transactions on Graphics, vol. 33, No. 4, Article 127, Jul. 2014, ACM, 13 pages.
Lalonde, J., et al., "Estimating Natural Illumination from a Single Outdoor Image," 2009 IEEE 12th International Conference on Computer Vision (ICCV), 2009, IEEE, pp. 183-190.
Lalonde, J., et al., "Webcam Clip Art: Appearance and Illuminant Transfer from Time-lapse Sequences," ACM Transactions on Graphics, vol. 28, No. 5, Article 131, Dec. 2009, ACM, 10 pages.
Mandl, D., et al., "Learning Lightprobes for Mixed Reality Illumination," 2017 IEEE International Symposium on Mixed and Augmented Reality, 2017, IEEE, pp. 82-89.
Massimiliano, C., et al., "Stereo Light Probe," Eurographics 2008, vol. 27, No. 2, 2008, The Eurographics Assoication and Blackwell Publishing Ltd., pp. 291-300.
Nishino, K., et al., "Eyes for Relighting," ACM Press ACM SIGGRAPH 2004 Papers, 2004, ACM, pp. 704-711.
Nowrouzezahrai, D., et al., "Light Factorization for Mixed-Frequency Shadows in Augmented Reality," IEEE International Symposium on Mixed and Augmented Reality 2011 Science and Technology Proceedings, Oct. 26-29, 2011, Switzerland, IEEE, pp. 173-179.
Ramamoorthi, R., et al., "An Efficient Representation for Irradiance Environment Maps," ACM SIGGRAPH 2001, Aug. 12-17, 2001, Los Angeles, California, ACM, pp. 497-500.
Richter-Trummer, T., et al., "Instant Mixed Reality Lighting from Casual Scanning," IEEE 2016 IEEE International Symposium on Mixed and Augmented Reality (ISMAR), 2016, IEEE, pp. 27-36.
Rohmer, K, et al., "Interactive Near-Field Illumination for Photorealistic Augmented Reality on Mobile Devices," IEEE International Symposium on Mixed and Augmented Reality 2014 Science and Technology Proceedings, Sep. 10-12, 2014, Munich, Germany, IEEE, pp. 29-38.
Rohmer, K., et al., "Natural Environment Illumination: Coherent Interactive Augmented Reality for Mobile and non-Mobile Devices," IEEE Transactions on Visualization and Computer Graphics, vol. 23, No. 11, Nov. 2017, IEEE, pp. 2474-2484.
Sato, I., et al., "Acquiring a Radiance Distribution to Superimpose Virtual Objects onto a Real Scene," IEEE Transactions on Visualization and Computer Graphics, vol. 5, No. 1, Jan.-Mar. 1999, IEEE, pp. 1-12.
Shepard, D., "A two-dimensional interpolation function for irregularly-spaced data," Proceedings—1968 ACM National Conference, 1968, pp. 517-524.
Sloan, P., et al., "Precomputed Radiance Transfer for Real-Time Rendering in Dynamic, Low-Frequency Lighting Environments," ACM Transactions on Graphics, vol. 21, No. 3, 2002, ACM, pp. 527-536.
Unger, J., et al., "Capturing and Rendering With Incident Light Fields," Eurographics Symposium on Rendering 2003, The Eurographics Association, 2003, pp. 1-10.
Unger, J., et al., "Free Form Incident Light Fields," Eurographics Symposium on Rendering 2008, vol. 27, No. 4, The Eurographics Association and Blackwell Publishing Ltd., 2008, pp. 1293-1301.
Unger, J., et al., "Spatially varying image based lighting by light probe sequences," The Visual Computer, vol. 23, No. 7, May 2007, Springer-Verlag, pp. 453-465.
Unger, J., et al., "Temporally and Spatially Varying Image Based Lighting Using HDR-Video," 21st European Signal Processing Conference (EUSIPCO 2013), Sep. 9-13, 2013, IEEE, 5 pages.
Wang, Y., et al., "Estimation of multiple directional light sources for synthesis of augmented reality images," Graphical Models, vol. 65, 2003, Elsevier Science, pp. 185-205.
Whelan, T., et al., "Reconstructing Scenes with Mirror and Glass Surfaces," ACM Transactions on Graphics, vol. 37, No. 4, Article 102, Aug. 2018, Association for Computing Machinery, 11 pages.
Xing, G., et al., "Lighting Simulation of Augmented Outdoor Scene Based on a Legacy Photograph," Pacific Graphics, vol. 32, No. 7, 2013, John Wiley and Sons Ltd., pp. 101-110.
Zhang, E., et al., "Emptying, Refurnishing, and Relighting Indoor Spaces," ACM Transactions on Graphics, vol. 35, No. 6, Article 174, Nov. 2016, 14 pages.

* cited by examiner

ILLUMINATION ESTIMATION FOR CAPTURED VIDEO DATA IN MIXED-REALITY APPLICATIONS

RELATED APPLICATIONS

This application claims the benefit of provisional patent application Ser. No. 62/738,521, filed Sep. 28, 2018, the disclosure of which is hereby incorporated herein by reference in its entirety.

FIELD OF THE DISCLOSURE

This application relates to illumination estimation using video data.

BACKGROUND

Light estimation is a critical component of photorealistic rendering of virtual scenes. For augmented reality (AR), a merging of virtual and physical worlds, accurate light estimation is especially important; inaccuracies in light estimation create noticeable visual inconsistencies between the virtual scene and physical environment.

For example, FIG. 1A is an image of a virtual scene 10 based on a sample environment 12 and produced using a traditional light estimation approach. Lighting inconsistencies remove a user from the immersive experience of AR, whether or not the user is consciously aware of the inaccuracy in the virtual scene illumination. These inconsistencies can be more noticeable for certain virtual materials. While matte "Lambertian" surfaces suffice with most forms of virtual lighting, correct representation of specular surfaces requires a rich estimation of lighting. Without appropriate illumination estimation, AR developers are forced to avoid the use of even partially reflective materials, such as glass, liquid, and polished metal.

Sufficient light estimation requires estimating not only the intensity of light, but also the directionality of light. Further, light estimation must be updated in real-time, adjusting to changes in the dynamic environment of a physical setting (e.g., people casting shadows, opening/closing doors, or turning on/off lights). Consequently, current approaches have thus far been inadequate. One current approach provides coarse illumination estimation through ambient light sensing of average pixel values in a scene. Meanwhile, other approaches and academic research solutions sample light transmissions from the scene geometry and use machine learning inferences to estimate directional light intensity. However, such approaches can be computationally expensive and slow to update (for example, only updating once per 3.7 seconds). In addition, these techniques are prone to inaccuracy when filling in missing information.

SUMMARY

Systems and methods for illumination estimation for captured video data in mixed-reality applications are provided. Embodiments described herein compose an illumination estimate using video data capturing an environment which includes a reflective object, such as a light probe. Radiance samples are computed from light reflections from the reflective object, which are then interpolated to compose a realistic estimation of physical lighting of the environment. Robust illumination estimation is provided in a computationally efficient manner, supplying real-time updates to facilitate integration with augmented reality (AR) systems and other image processing applications. The computational efficiency of this approach allows for implementation in lower-resource applications, such as mobile devices. In some examples, multiple devices can collaborate to capture the environment from different viewpoints and enhance realism and fidelity in their illumination estimates.

An exemplary embodiment provides a method for estimating illumination in captured video data. The method includes obtaining first video data from a first camera capturing an environment comprising a reflective surface. The method further includes generating a first plurality of radiance samples by geometrically calculating light reflections from the reflective surface. The method further includes producing a three-dimensional (3D) illumination mapping of the environment captured in the first video data by interpolating the first plurality of radiance samples.

Another exemplary embodiment provides a mobile device. The mobile device includes a first camera and a processing device coupled to the first camera. The processing device is configured to obtain first video data from the first camera capturing an environment comprising a reflective surface. The processing device is further configured to generate a first plurality of radiance samples by geometrically calculating light reflections from the reflective surface. The processing device is further configured to produce a 3D illumination mapping of the environment captured in the first video data by interpolating the first plurality of radiance samples.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1A:
FIG. 1A is an image of a virtual scene based on a sample environment and produced using a traditional light estimation approach.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Systems and methods for collaborative illumination estimation for mobile mixed-reality devices are provided. Embodiments described herein compose an illumination estimate using video data capturing an environment which includes a reflective object, such as a light probe. Radiance samples are computed from light reflections from the reflective object, which are then interpolated to compose a realistic estimation of physical lighting of the environment. Robust illumination estimation is provided in a computationally efficient manner, supplying real-time updates to facilitate integration with augmented reality (AR) systems and other image processing applications. The computational efficiency of this approach allows for implementation in lower-resource applications, such as mobile devices. In some examples, multiple devices can collaborate to capture the environment from different viewpoints and enhance realism and fidelity in their illumination estimates.

Figure 1B:
FIG. 1B is an image of an improved virtual scene based on the sample environment of FIG. 1A and produced using an embodiment of an illumination estimation approach described herein.

FIG. 1B is an image of an improved virtual scene 14 based on the sample environment 12 of FIG. 1A and produced using an embodiment of an illumination estimation approach described herein. As illustrated in FIG. 1B, the illumination estimation approach (which may be referred to as the Generating Light Estimation Across Mixed-reality (GLEAM) approach) creates visual harmony between objects in the improved virtual scene 14 and the sample environment 12 for improved photorealism.

The GLEAM approach which produced the improved virtual scene 14 observes images of a geometrically-tracked reflective surface (e.g., a light probe) to estimate incoming light in a physical environment (e.g., the sample environment 12), such as described further below with respect to FIG. 2. Based on video data capturing the reflective surface, radiance samples are generated and a three-dimensional (3D) mapping of the physical environment is produced, such as the cubemap illustrated in FIGS. 3A and 3B. An example modular process for estimating illumination, including a radiance sample module, an optional network transfer module, and a cubemap composition module is described further below with respect to FIGS. 4A-4C and FIG. 5. A flow diagram and computer system diagram for embodiments implementing the GLEAM approach are described below with respect to FIGS. 6 and 7, respectively.

Figure 2:
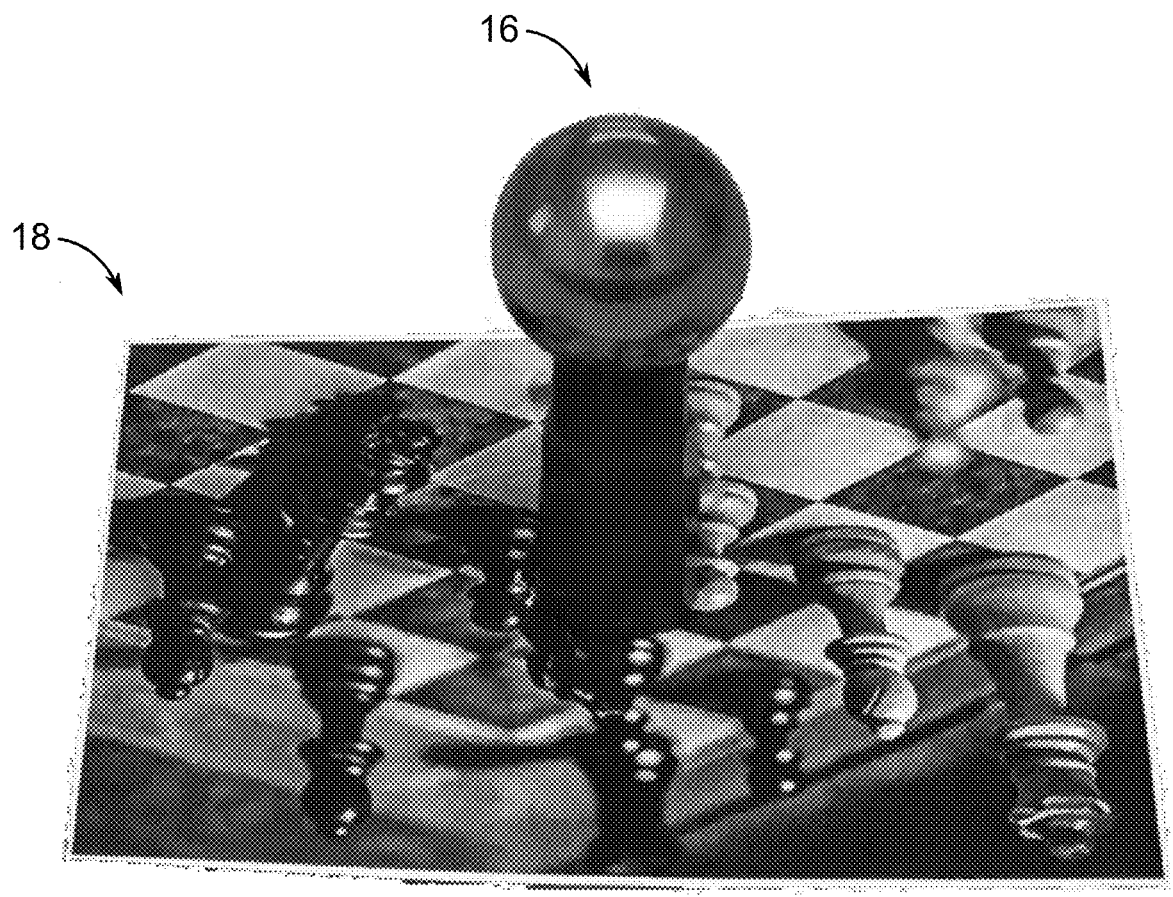
FIG. 2 is an image illustrating an example reflective surface, which is tracked and observed to estimate incoming light in an environment (e.g., the sample environment of FIGS. 1A and 1B, or another environment) under the illumination estimation approach.

FIG. 2 is an image illustrating an example reflective surface 16, which is tracked and observed to estimate incoming light in an environment (e.g., the sample environment 12 of FIGS. 1A and 1B, or another environment) under the illumination estimation approach. To perform broad, accurate, and real-time illumination estimation, the GLEAM approach employs the technique of physical light probe estimation, capturing images of the reflective surface 16 to reveal environmental lighting information. In some examples, the reflective surface 16 is a light probe (as illustrated). The light probe is a reflective object, such as a chrome ball, placed at a location in an environment where the lighting needs to be sensed. By associating captured pixels with the angle of incoming light, embodiments can construct estimations of surrounding lighting. In addition, using physical light probe estimation delivers higher visual fidelity and richness since radiance is measured at the location where the virtual scene is to be rendered.

A light probe can be attached to hand-held controllers, game pieces, or other physical objects. In some examples, the light probe has a known shape and includes or is positioned adjacent a positioning marker 18 in order to geometrically track the relative position of the reflective surface 16 and a camera capturing the environment. In some examples, a different reflective surface 16 may be present in the environment (e.g., one having a convex shape), and a shape of the reflective surface is inferred from captured video data. In such examples, the relative position of the reflective surface 16 may be tracked based on inferred distances from objects in the environment near the reflective surface 16.

Figure 3A:
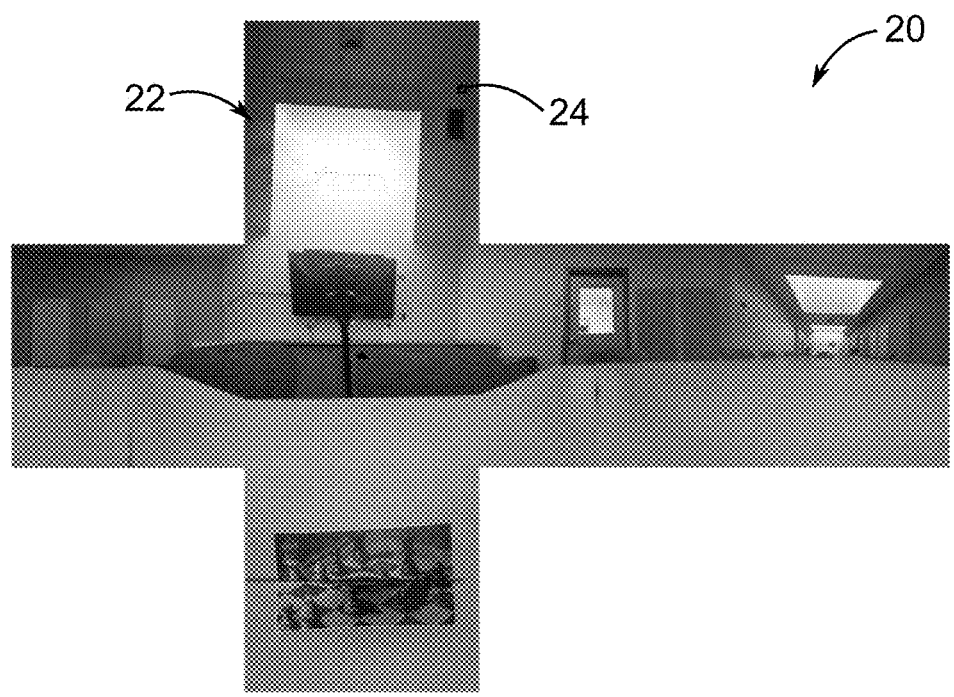
FIG. 3A is a two-dimensional rendering of a cubemap, an exemplary three-dimensional (3D) mapping of an environment captured for illumination estimation.
Figure 3B:
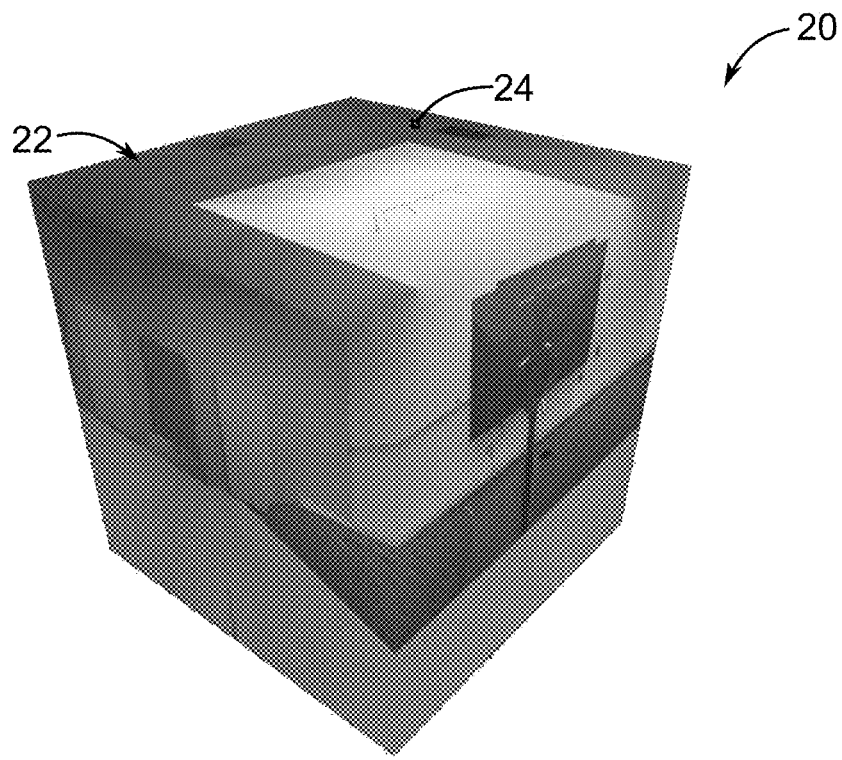
FIG. 3B is a rendering of the cubemap of FIG. 3A folded to form a 3D cube.

FIG. 3A is a two-dimensional rendering of a cubic environment map or cubemap 20, an exemplary 3D mapping of an environment captured for illumination estimation. FIG. 3B is a rendering of the cubemap 20 of FIG. 3A folded to form a 3D cube. Approaches to illumination estimation in graphical rendering generally rely on building illumination models that graphics renderers can use to illuminate virtual scenes realistically for enhanced visual appeal.

Illumination models are often formulated under the "distant scene assumption": the intensity of an incoming ray depends on the direction of incidence only. Thus, modeling illumination boils down to mapping angular directions in the 3D space to light ray intensity. Under the distant scene assumption, illumination models can be represented in the form of environment maps, mapping incoming ray direction to ray intensity. The cubemap 20 is a commonly used representation for an environment map. The cubemap 20 includes six cubemap faces 22 (e.g., representing a top, bottom, and sides of a cubic 3D space), each composed of a number of texture elements or texels 24. Each texel 24 on a cubemap face 22 maps to a discrete direction. Thus, mapping directions as the vector between the center of the cubemap 20 and its texels 24, the cubemap 20 stores intensities spanning angular directions in 3D space.

It should be understood that the cubemap 20 is an illustrative example of a 3D illumination mapping of the environment. In other examples, the GLEAM approach may produce a different 3D illumination mapping, such as a rectilinear mapping or an equirectangular mapping.

Figure 4A:
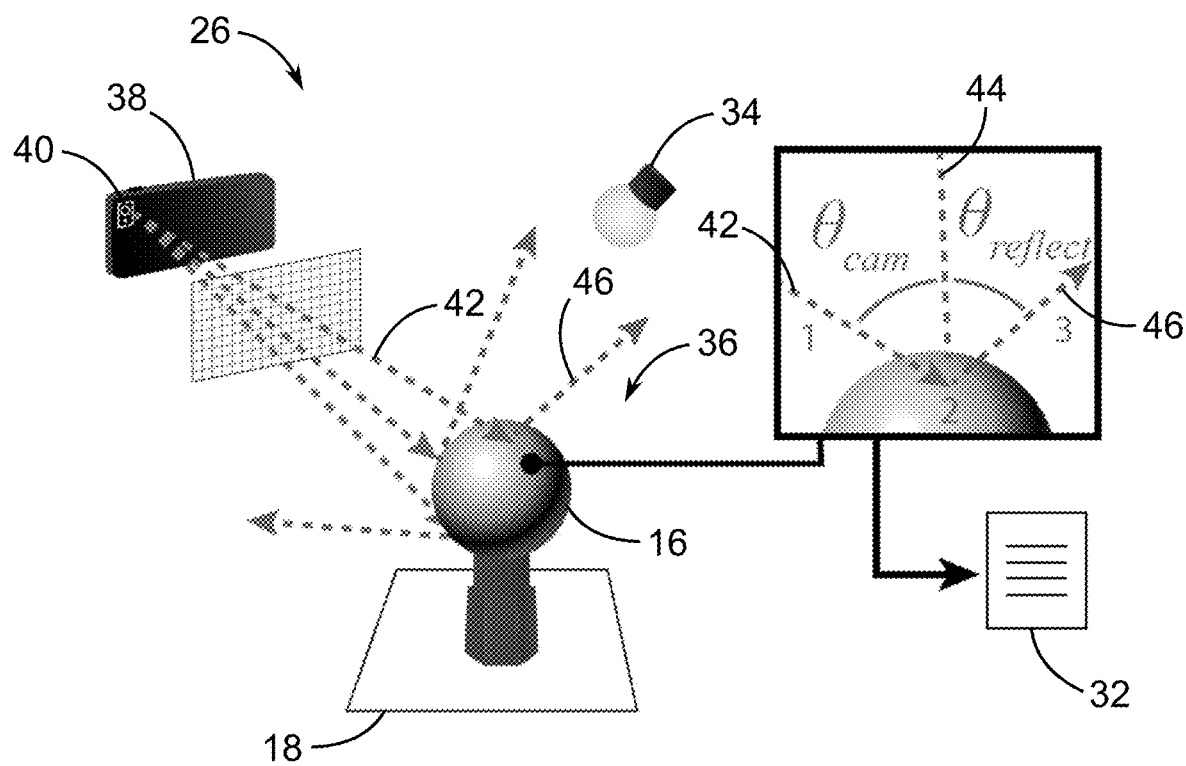
FIG. 4A is a schematic diagram detailing a radiance sample module, which generates radiance samples from video data using the reflective surface of FIG. 2.
Figure 4B:
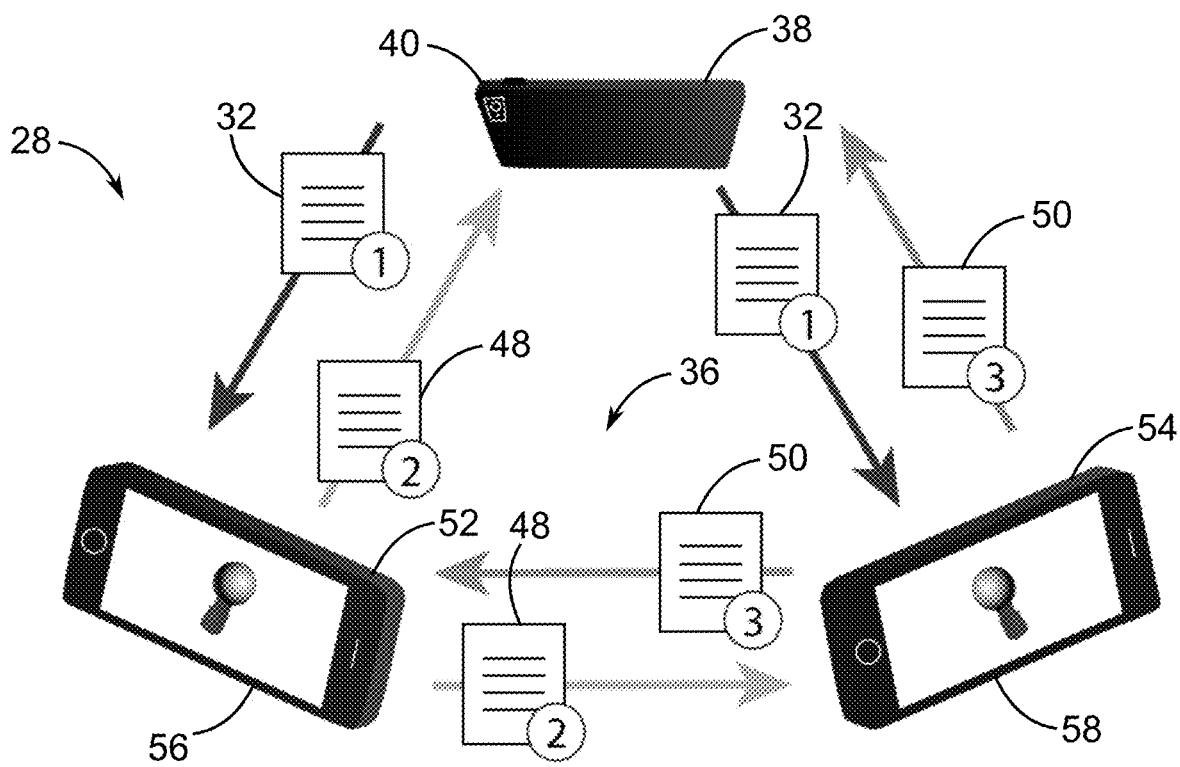
FIG. 4B is a schematic diagram detailing an optional network transfer module, which facilitates sharing of radiance samples among multiple cameras capturing the environment.
Figure 4C:
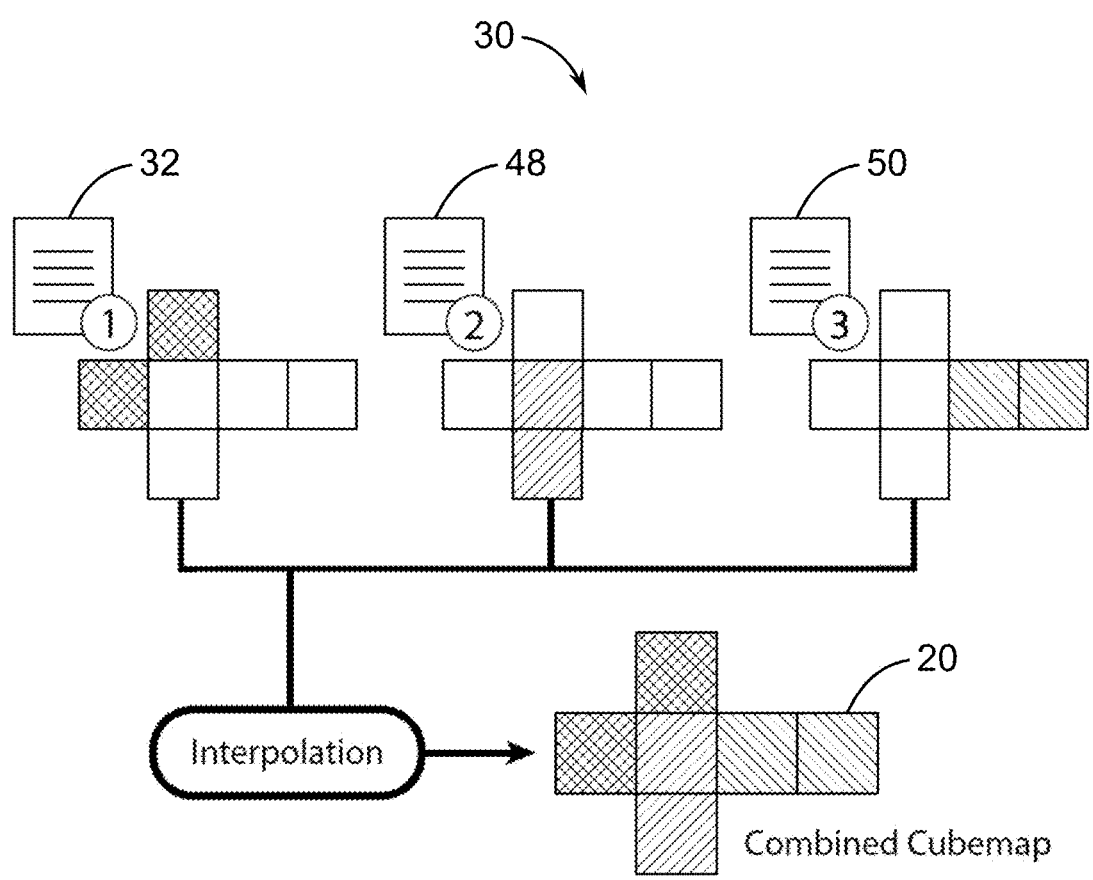
FIG. 4C is a schematic diagram detailing a cubemap composition module for producing the 3D illumination mapping of the environment, such as the cubemap, using the radiance samples.

FIGS. 4A-4C illustrate an example modular process for estimating illumination, including a radiance sample module 26, an optional network transfer module 28, and a cubemap composition module 30. In this regard, FIG. 4A is a schematic diagram detailing the radiance sample module 26, which generates radiance samples 32 from video data using the reflective surface 16 of FIG. 2. The radiance samples 32 generated in the radiance sample module 26 can be used by subsequent modules for producing the 3D illumination mapping.

Each texel 24 of the 3D illumination mapping (e.g., the cubemap 20 of FIGS. 3A and 3B) associates illumination radiance intensity and color to the angular directions of incoming light 34 towards a virtual (e.g., AR) scene representing an environment 36. The radiance samples 32 provide this radiance information, which can then be interpolated to form the cubemap 20 (e.g., in the cubemap composition module 30 of FIG. 4C).

In this regard, a mobile device 38 or other device includes a camera 40 which captures video data (e.g., at least a portion of images and/or video content, which can be captured and processed in real time) of the environment 36 which includes the reflective surface 16 (e.g., a light probe) having a known (or determined) shape and position. The captured video data can geometrically reveal radiance information for the radiance samples 32 as the reflective surface 16 reflects light into the camera 40. Thus, to capture the radiance samples 32 for the 3D illumination mapping, the reflective surface 16 can be positioned in the environment 36 with respect to the positioning marker 18.

The radiance samples 32 are generated by geometrically calculating light reflections from the reflective surface 16. In this regard, the radiance sample module 26 uses marker-based pose estimation tools to geometrically track the relative position of the camera 40 and the positioning marker 18 to indirectly calculate positions for the virtual scene, including relative positions of a virtual camera, specular objects, and the environment 36.

Specular reflection, such as from the reflective surface 16, follows a strict geometric pattern: the angle of a reflected ray from a surface normal $\theta_{reflect}$ matches an angle of an incident ray from a surface normal $\theta_{cam}$. As illustrated in FIG. 4A, the radiance sample module 26 leverages this principle to estimate the radiance samples 32 using the following process:

1) Project a virtual ray 42 from each pixel along its camera ray ($\theta_{cam}$) into the virtual scene.

2) Determine if and where a collision occurs between the virtual ray 42 and the reflective surface 16 in the environment 36.

3) Reflect the virtual ray 42 over a collision surface normal 44 to generate an incoming ray 46 vector ($\theta_{reflect}$).

4) Associate the pixel color and intensity of the captured video data with the angle of the incoming ray 46. This association is a radiance sample 32.

In some examples, the radiance sample module 26 is on an augmented reality engine, leveraging the geometric ray-casting and collision capabilities of the augmented reality engine to execute all four of these steps with optimized computational efficiency.

FIG. 4B is a schematic diagram detailing the optional network transfer module 28, which facilitates sharing of radiance samples 32, 48, 50 among multiple cameras 40, 52, 54 capturing the environment 36. With the optional network transfer module 28, radiance samples can be collected from multiple viewpoints. Radiance samples generated from a single viewpoint may only cover partial regions of the 3D illumination mapping. The remaining regions can be coarsely estimated through interpolation, as will be discussed in the cubemap composition module 30 of FIG. 4C.

However, in situations where multiple users view the same scene (e.g., classroom or museum scenarios) there is opportunity for the radiance samples 32, 48, 50 from multiple viewpoints to contribute to jointly populate the 3D illumination mapping. To leverage this, the optional network transfer module 28 shares illumination information from multiple cameras, such as a first camera 40, a second camera 52, and a third camera 54. In some examples, the first camera 40, the second camera 52, and the third camera 54 are respectively in or coupled to a first mobile device 38, a second mobile device 56, and a third mobile device 58. In such examples, the illumination information is shared across a local network. In other examples, the first camera 40, the second camera 52, and the third camera 54 can be coupled to a common device, and the illumination information may be directly used in composing the 3D illumination mapping.

In some embodiments of the optional network transfer module 28, upon generation of first radiance samples 32, the first mobile device 38 having the first camera 40 transmits the first radiance samples 32 to the second mobile device 56 and the third mobile device 58 (e.g., over the local network via a network interface device). The first mobile device 38 also receives second radiance samples 48 from the second mobile device 56 having the second camera 52 and third radiance samples 50 from the third mobile device 58 having the third camera 54.

In this manner, the mobile devices 38, 56, 58 operating the optional network transfer module 28 observing the same environment 36 share their radiance samples 32, 48, 50. In some examples, local multiplayer augmented reality engines adopt a client-server model, using the server to synchronize information among multiple clients. In some examples, to remove the need for a dedicated server, the server behavior is often hosted on one of the client applications, which becomes a multiplayer "host," and the radiance samples 32, 48, 50 are transferred with negligible latency.

FIG. 4C is a schematic diagram detailing the cubemap composition module 30 for producing the 3D illumination mapping of the environment, such as the cubemap 20, using the radiance samples 32, 48, 50.

The radiance samples (e.g., the first radiance samples 32, the second radiance samples 48, and the third radiance samples 50) form a sparse estimation of illumination. To create a usable cubemap 20, the cubemap composition module 30 spatially interpolates the radiance samples 32, 48, 50 into a cubemap space. In some examples, the cubemap 20 is produced by only interpolating generated radiance samples (e.g., the first radiance samples 32 from the first camera 40 of FIG. 4B). In some examples, the cubemap 20 is produced by interpolating both generated radiance samples (e.g., the first radiance samples 32) and received radiance samples (e.g., the second radiance samples 48 and the third radiance samples 50).

While choosing interpolation algorithms, it is necessary to consider not only interpolation quality, but also computational overhead. This is especially important because the cubemap 20 updates on every newly processed list of radiance samples 32, 48, 50, repeatedly incurring interpolation overhead. In some embodiments, the cubemap composition module 30 uses a modified inverse distance weighting (IDW) interpolation to fill the cubemap 20. The IDW interpolation operates on each texel 24 of the cubemap 20, computing a weighted average of nearby radiance samples 32, 48, 50. The cubemap composition module 30 primarily weights each radiance sample 32, 48, 50 by the inverse of its distance from the texel 24. For low complexity, some examples use Manhattan Distance as the distance function:

$$d(x, x_i) = \|x - x_i\|_1 \sum_{j=1}^{n} |x_i - x_{ij}|$$

The cubemap composition module 30 also weights the radiance samples 32, 48, 50 based on reliability, depending on where a given radiance sample 32, 48, 50 was captured from. For example, radiance samples 32, 48, 50 collected on an outer rim of the reflective surface 16 are subject to distortion from projection offset inaccuracies. The angular inaccuracy is directly proportional to the angular deviation between the pixel's camera ray vector $\theta_{cam}$ and the reflected incoming ray vector $\theta_{reflect}$. Thus, the cubemap composition module 30 uses the inverse of the angular deviation as a reliability score $r_i = 2\pi/<(\theta_{cam}, \theta_{reflect})$, weighting reliable samples stronger for cubemap consideration. Notably, multi-viewpoint embodiments will allow radiance samples 32, 48, 50 having lower reliability from one viewpoint to be overridden by radiance samples 32, 48, 50 having higher reliability from another viewpoint. The reliability score combines with the distance to form a sample weight:

$$w_i(x) = \frac{r_i}{d(x, x_i)}$$

The interpolated intensity u of texel x from nearby samples $u_i = u(x_i)$ for $i = 1, 2, \ldots N$ is found using the IDW function given by:

$$u(x) = \begin{cases} \dfrac{\sum_{i=1}^{N} w_i(x) u_i}{\sum_{i=1}^{N} w_i(x)}, & \text{if } d(x, x_i) \neq 0 \forall i; \\ u_i, & \text{if } d(x, x_i) = 0 \end{cases}$$

To computationally perform IDW interpolation, the cubemap composition module 30 iterates over the list of radiance samples 32, 48, 50, adding each sample's weighted intensity value and weight to all texels 24 of the cubemap 20 within a neighborhood radius. The cubemap composition module 30 then iterates over the texels 24 of the cubemap 20, dividing the sum of weighted pixel values by the sum of distance weights to generate the interpolated texels 24. IDW interpolation will leave gaps in the cubemap 20 from texels 24 that do not occupy any sample neighborhoods. To fill the remaining gaps, the cubemap composition module 30 uses a nearest neighbor algorithm to assign missing texels 24 of the cubemap 20.

IDW and nearest neighbor are two of many interpolation mechanisms that can satisfy the needs for the cubemap composition module 30. Other strategies (e.g., structural inpainting or neural network-based methods) are also viable solutions, with potentially higher quality at the expense of computational complexity. By interpolating the radiance samples 32, 48, 50 into a full cubemap 20 on a per-frame basis, the cubemap composition module 30 provides a dynamically updating scene illumination.

Figure 5:
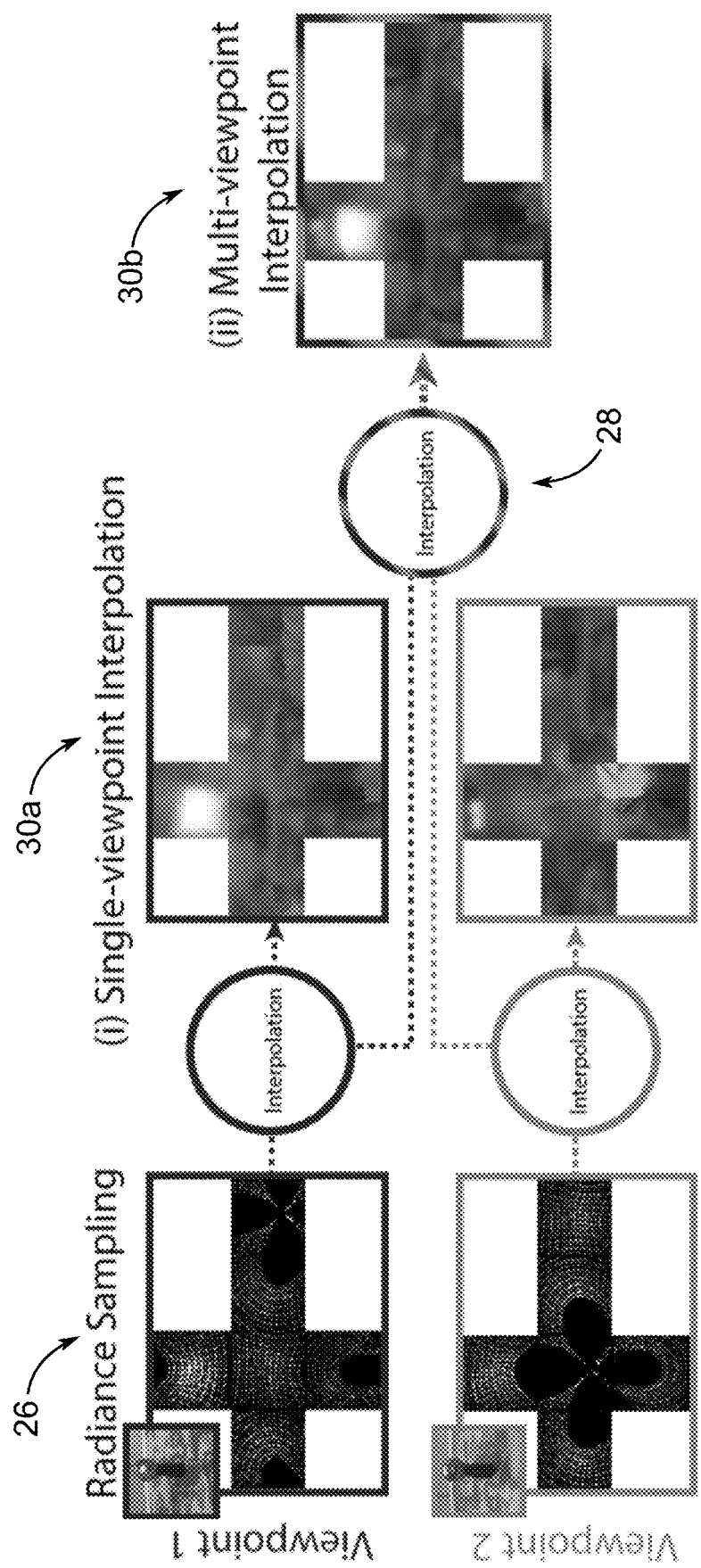
FIG. 5 is schematic diagram further detailing the composition of the 3D illumination mapping of FIG. 4C.

FIG. 5 is schematic diagram further detailing the composition of the 3D illumination mapping of FIG. 4C. FIG. 5 illustrates the effective results of the modular process for estimating illumination of FIGS. 4A-4C, including the radiance sample module 26, the optional network transfer module 28, a single-viewpoint application 30a and a multi-viewpoint application 30b of the cubemap composition module 30.

With continuing reference to the modular process for estimating illumination of FIGS. 4A-4C and FIG. 5, the realism of the virtual scene rendered by AR engines depends on the quality of illumination estimation. Multiple quality factors contribute to a high quality 3D illumination mapping, including coverage, freshness, resolution, and a fast update interval. Under a fixed set of computational resources, these quality factors compete with one another, necessitating tradeoffs to sacrifice some factors for others.

However, not all quality factors are needed for all situations. Specifically, depending on the virtual scene materials and the dynamic nature of the physical environment, various quality factors can be promoted over others. Leveraging this fact, the GLEAM approach can trade off quality factors through parameterized policies.

Quality factor definitions: Coverage defines the angular spread of the radiance samples 32 over the cubemap 20. Covering larger regions of the cubemap 20 allows for accurate representation of lights and shadows from more angles. The optional network transfer module 28 assists with coverage by collecting radiance samples 32 from multiple viewpoints.

Resolution defines the amount of detail the illumination estimation can represent. Higher resolution is beneficial in virtual scenes with smooth reflective materials, in which the surrounding environment 36 is visible. This includes glass materials, polished metals, and liquid surfaces. For non-smooth materials, illumination estimation resolution is less perceptible; in virtual scenes with rough or matte materials, the resolution can be reduced without detriment.

Freshness defines how long ago the illumination estimation information was sampled. Higher freshness allows the estimation to adapt quicker to changes in the environment by discarding older estimation information. Lower freshness accumulates estimation information to build estimations with higher coverage and resolution, but blurs environmental changes over time. Thus, freshness is useful to capture the needs of the dynamically changing physical environments, but can be sacrificed to assist in other quality factors, especially in static physical environments.

Update Interval defines the rate at which the illumination estimation is refreshed. While freshness indicates the age of the oldest radiance samples 32 used in an estimation, the update interval indicates the recency of the newest radiance samples 32 to be included in an estimation. For dynamically changing environments, a fast update interval will allow the illumination estimation to quickly incorporate changes in the physical environment. However, to allot time to collect radiance samples 32 and compute cubemaps 20, the GLEAM approach may sacrifice update interval to ensure other quality factors.

Figure 6A:
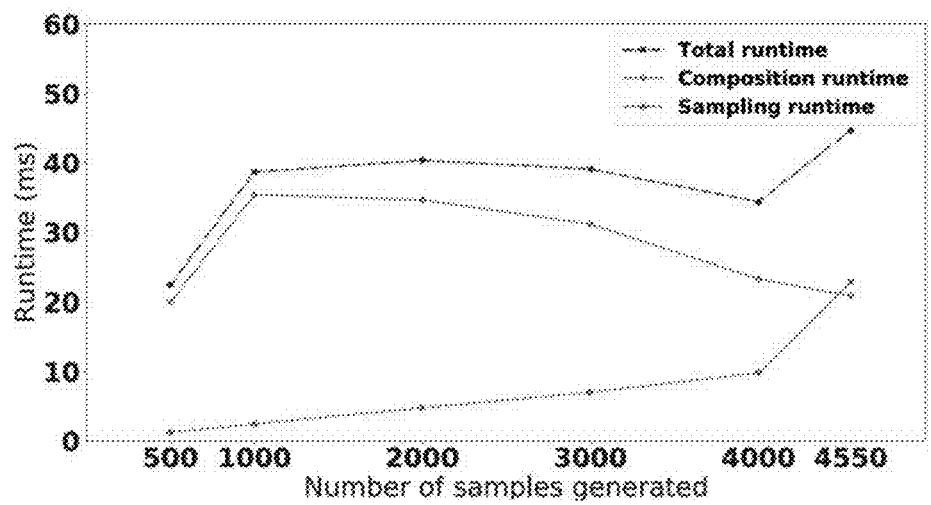
FIG. 6A is a graphical representation of runtime as a function of the number of samples generated for a simulation in which the cubemap face resolution is set to 64 and the age is set to 2000 milliseconds (ms).
Figure 6B:
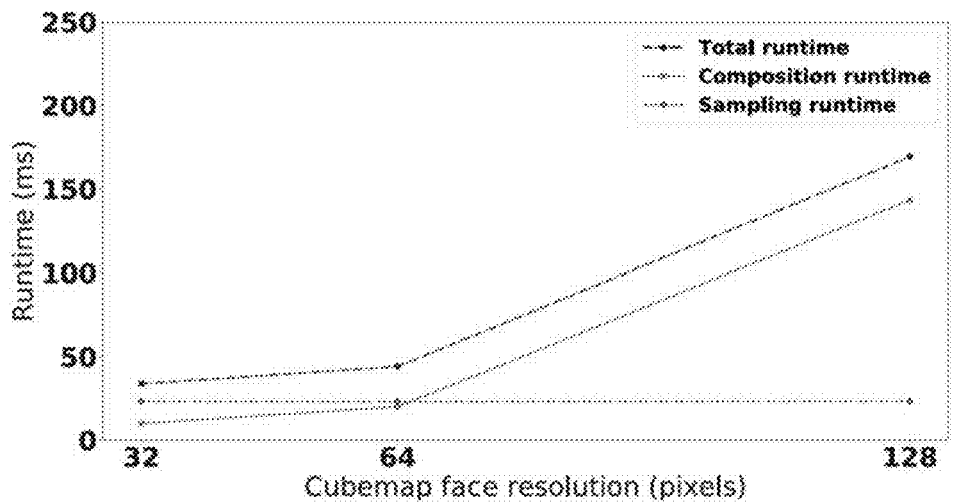
FIG. 6B is a graphical representation of runtime as a function of the cubemap face resolution for a simulation in which the number of samples is set to a maximum of 4500 and the age is set to 2000 ms.
Figure 6C:
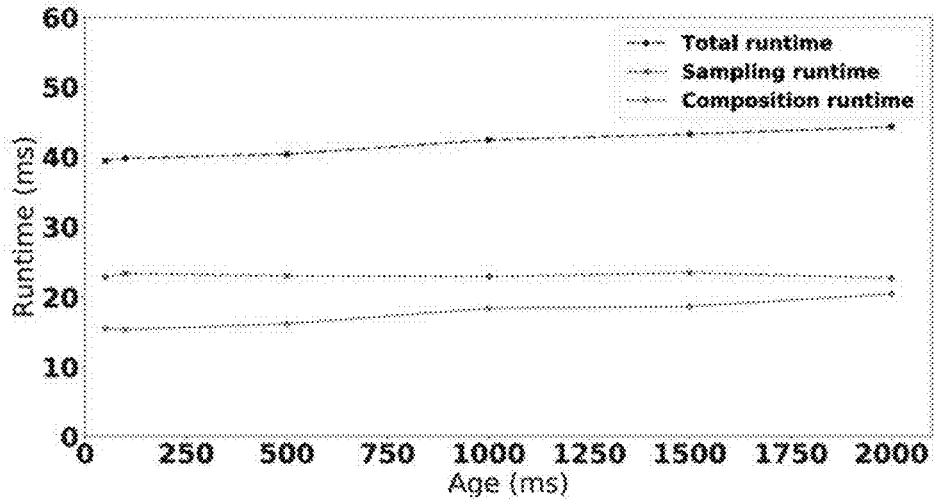
FIG. 6C is a graphical representation of runtime as a function of the age for a simulation in which the number of samples is set to a maximum of 4500 and the cubemap face resolution is set to 64.

FIGS. 6A-6C illustrate trends in runtime of the GLEAM approach and its modules based on the three parameters that control quality factors under simulations. With reference to FIGS. 6A-6C, situation-driven tradeoffs in these parameters are further discussed below.

FIG. 6A is a graphical representation of runtime as a function of the number of radiance samples 32 generated for a simulation in which the cubemap face 22 resolution is set to 64 and the age is set to 2000 milliseconds (ms). The GLEAM approach can collect a different number of radiance samples 32 to balance the coverage, resolution, and update interval. Spiraling outward from the center of an image of the reflective surface 16 (e.g., light probe), a larger collection of radiance samples 32 will span a broader set of angles to populate the cubemap 20. If the distance between the reflective surface 16 and the camera 40 is increased, the amount of radiance samples 32 generated decreases. This is because at farther distances, fewer pixels capture the reflective surface 16.

The number of radiance samples captured also has an effect on the runtime performance of the radiance sampling runtime and the cubemap composition runtime, as shown in FIG. 6A. Together, the total runtime limits the update interval of the estimation. With an increasing number of radiance samples, the sampling workload increases, raising the sampling runtime. However, at and above 1000 radiance samples, raising the number of radiance samples reduces the composition runtime. This is because the interpolation workload decreases as angular coverage increases. Altogether, this creates a relatively constant update interval of 34-45 ms between 1000 and 4000 radiance samples.

With 500 radiance samples, however, both sampling and composition runtimes are low. The composition workload decreases, as radiance samples 32 are interpolated over fewer cubemap faces 22, using average pixel value to populate the missing faces. This improves the update interval to a lower 22 ms, allowing for rapid adaptation to dynamic environment at the expense of resolution and coverage.

While performing characterization experiments, the system captured up to 4500 radiance samples for a fixed distance and FullHD resolution scenario. The variation in number of radiance samples is due to the radiance sampling algorithm, which checks if all possible samples are extracted for every frame. The algorithm takes additional time near the edges of the reflective surface 16 to check the same which also contributes to the non-linear behavior in FIG. 6A when sampling at max-capacity.

FIG. 6B is a graphical representation of runtime as a function of the cubemap face 22 resolution for a simulation in which the number of radiance samples 32 is set to a maximum of 4500 and the age is set to 2000 ms. The resolution of the cubemap 20 allows a tradeoff between detail capture and runtime performance. As shown in FIG. 6B, higher resolutions degrade the composition runtime performance, limiting update interval. For a cubemap face resolution of 64 pixels, the GLEAM approach achieves an update interval of 44 ms, which increases to 170 ms when the resolution is doubled to 128.

The rise in computational cost on increasing the face resolution is due to an increase in the number of texels 24 that need to be filled in the cubemap 20. Doubling the face resolution increases the number of texels 24 in the cubemap 20 by four times, increasing the composition workload.

However, higher cubemap face resolutions will allow an improvement in the fidelity and richness of the appearance of smooth materials in virtual scenes. This is contingent on having enough radiance samples 32 to fill the dense cubemap space. For improved resolution, the sacrifice in update interval may be justified for virtual scenes with glass, metals, liquids, and other smooth surfaces.

FIG. 6C is a graphical representation of runtime as a function of the age for a simulation in which the number of radiance samples 32 is set to a maximum of 4500 and the cubemap face 22 resolution is set to 64. The GLEAM approach can maintain the freshness of the estimation by discarding radiance samples 32 above a given age threshold. Lower thresholds will allow the estimation to only keep radiance samples 32 that adapt to changing illumination in the physical environment 36. However, higher thresholds will allow the estimation to accumulate radiance samples 32 to improve the resolution and coverage of the cubemap 20 as the user moves around the environment 36. Notably, as shown in FIG. 6C, the age does not significantly affect the runtime performance of the GLEAM modules, and therefore has little effect on the update interval.

Thus, the threshold parameter for the age of radiance samples creates a tradeoff between freshness, resolution and coverage. As mentioned above, freshness is useful in expected dynamic lighting, while other quality factors should be prioritized for static lighting.

The three tradeoffs discussed with respect to FIGS. 6A-6C allow applications (such as AR engines) to prioritize (or compromise) qualities of coverage, resolution, freshness, and update interval of the GLEAM estimation. These tradeoffs can work with a single viewpoint GLEAM approach for a single device or a multi-viewpoint GLEAM approach with networked devices. Optimal prioritization becomes situation dependent; virtual scenes with smooth surfaces need high resolution, and dynamic lighting benefits from high freshness and low update interval. Applications can make decisions to tune GLEAM to the user and/or application needs.

Figure 7:
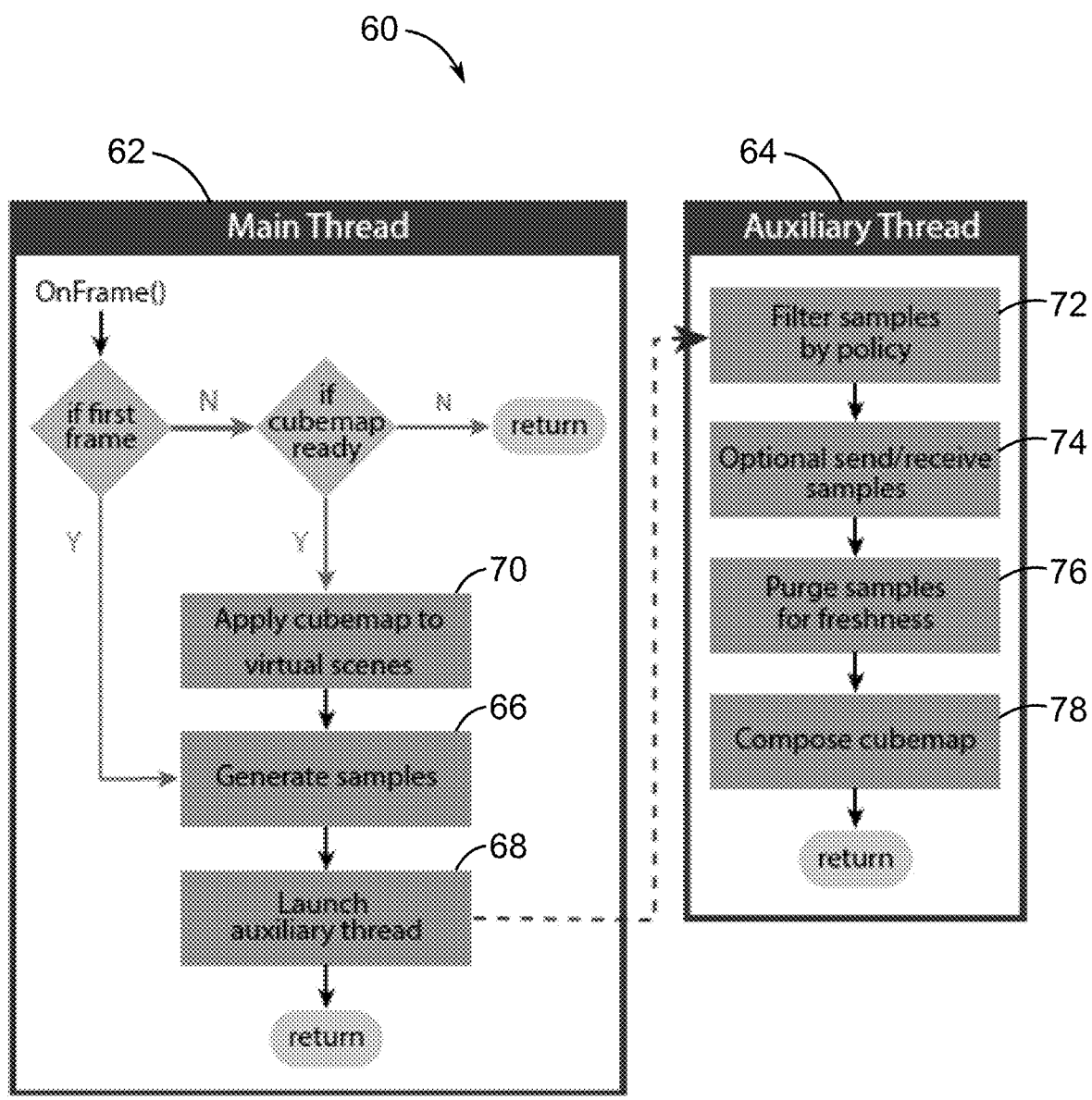
FIG. 7 is a flow diagram illustrating an example multi-threaded implementation of the illumination estimation approach.

FIG. 7 is a flow diagram illustrating an example multi-threaded implementation 60 of the illumination estimation approach. The illumination estimation approach may be implemented with an AR engine operating on a main thread 62 of a processing device and some or all of the illumination estimation operated on an auxiliary thread 64. In this manner, the auxiliary thread 64 keeps the main thread 62 free for interactive display frame rates.

The main thread 62 includes operations to compute the AR application state and render frames to an output device (e.g., a display). Thus, to preserve fast frame rates, operations of GLEAM performed on the main thread 62 are minimized. In some examples, sample generation requires main thread 62 operation to perform game physics raycasting. Applying the cubemap requires the main thread operation to influence rendering operations. All other GLEAM operations (e.g., the optional network transfer module 28 and the cubemap composition module 30) are performed on the auxiliary thread so as not to block the main thread 64 during operation. This facilitates fast frame rates, limited only by the overhead of pose estimation and position tracking.

In the main thread 62, if at a first frame, the multi-threaded implementation 60 begins at operation 66, with generating radiance samples 32 (e.g., the radiance sample module 26). The main thread 62 continues at operation 68, with launching the auxiliary thread 64 and returning to its beginning. If not at the first frame, the main thread determines if a cubemap 20 is ready. If yes, the main thread begins at operation 70, with applying the cubemap 20 to virtual scenes, and continues at operation 66. If the cubemap 20 is not ready, the main thread returns 62 to its beginning.

The auxiliary thread 64 begins at operation 72, with filtering the radiance samples 32 by policy. The auxiliary thread 64 continues at operation 74, with optionally sending and/or receiving radiance samples 32, 48, 50 (e.g., the network transfer module 28). The auxiliary thread 64 continues at operation 76, with purging samples for freshness. The auxiliary thread 64 continues at operation 78, with composing the cubemap 20 (e.g., cubemap composition module 30).

Figure 8:
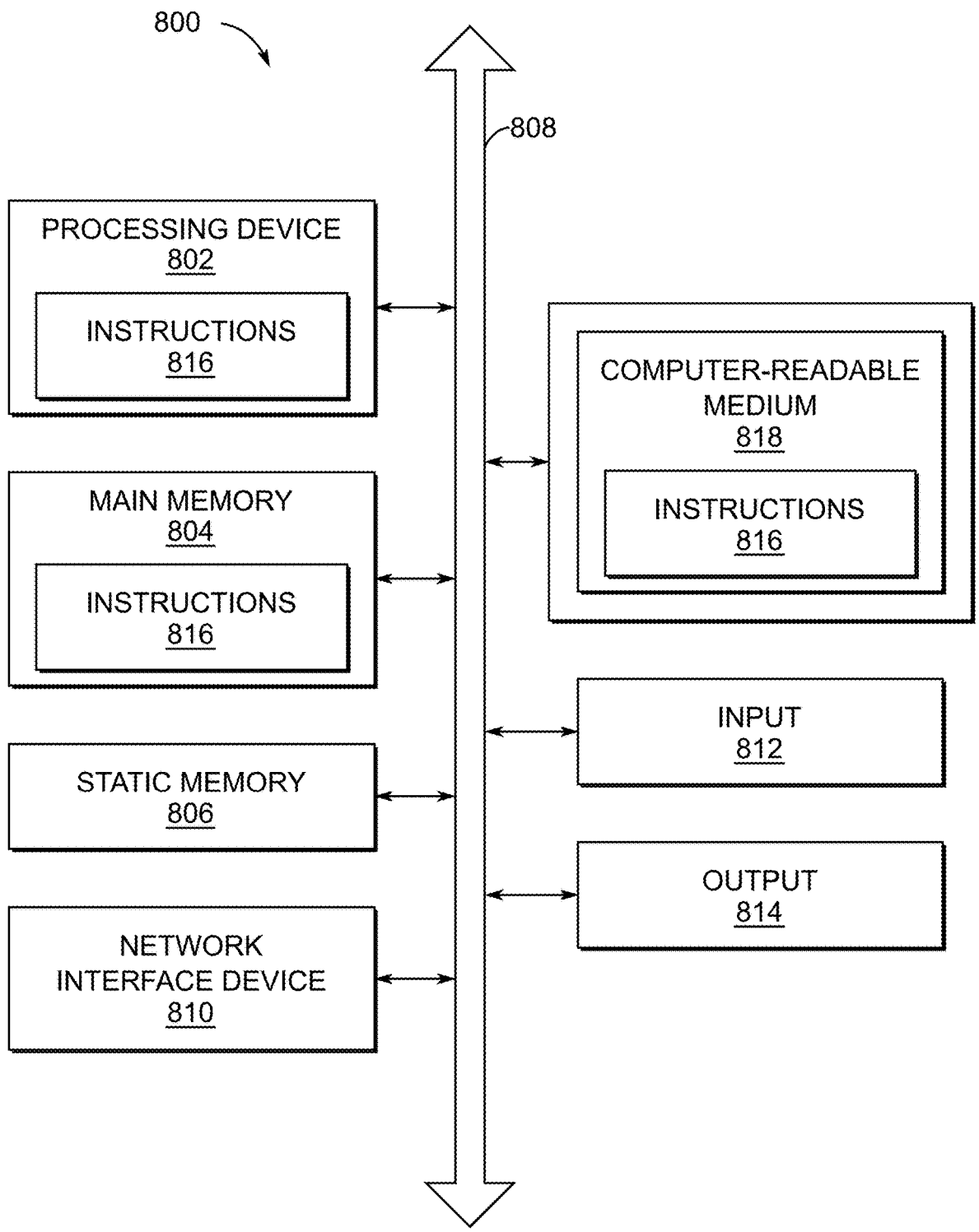
FIG. 8 is a schematic diagram of a generalized representation of an exemplary computer system that could be used to perform any of the methods or functions described above, such as estimating illumination in captured video data.

FIG. 8 is a schematic diagram of a generalized representation of an exemplary computer system 800 that could be used to perform any of the methods or functions described above, such as estimating illumination in captured video data. In some examples, the mobile device 38 is implemented as the computer system 800. In this regard, the computer system 800 may be a circuit or circuits included in an electronic board card, such as, a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 800 in this embodiment includes a processing device 802 or processor, a main memory 804 (e.g., read-only memory (ROM), flash memory, dynamic random access memory (DRAM), such as synchronous DRAM (SDRAM), etc.), and a static memory 806 (e.g., flash memory, static random access memory (SRAM), etc.), which may communicate with each other via a data bus 808. Alternatively, the processing device 802 may be connected to the main memory 804 and/or static memory 806 directly or via some other connectivity means. In an exemplary aspect, the processing device 802 could be used to perform any of the methods or functions described above.

The processing device 802 represents one or more general-purpose processing devices, such as a microprocessor, central processing unit (CPU), or the like. More particularly, the processing device 802 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 802 is configured to execute processing logic in instructions for performing the operations and steps discussed herein.

The various illustrative logical blocks, modules, and circuits described in connection with the embodiments disclosed herein may be implemented or performed with the processing device 802, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device 802 may be a microprocessor, or may be any conventional processor, controller, microcontroller, or state machine. The processing device 802 may also be implemented as a combination of computing devices (e.g., a combination of a DSP and a microprocessor, a plurality of microprocessors, one or more microprocessors in conjunction with a DSP core, or any other such configuration).

The computer system 800 may further include a network interface device 810. The computer system 800 also may or may not include an input 812, configured to receive input and selections to be communicated to the computer system 800 when executing instructions. In an exemplary aspect, the camera 40 of FIG. 4A is an input 812 to the computer system 800. The computer system 800 also may or may not include an output 814, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 800 may or may not include a data storage device that includes instructions 816 stored in a computer-readable medium 818. The instructions 816 may also reside, completely or at least partially, within the main memory 804 and/or within the processing device 802 during execution thereof by the computer system 800, the main memory 804, and the processing device 802 also constituting computer-readable medium. The instructions 816 may further be transmitted or received via the network interface device 810.

While the computer-readable medium 818 is shown in an exemplary embodiment to be a single medium, the term "computer-readable medium" should be taken to include a single medium or multiple media (e.g., a centralized or distributed database, and/or associated caches and servers) that store the one or more sets of instructions 816. The term "computer-readable medium" shall also be taken to include any medium that is capable of storing, encoding, or carrying a set of instructions for execution by the processing device 802 and that causes the processing device 802 to perform any one or more of the methodologies of the embodiments disclosed herein. The term "computer-readable medium"

shall accordingly be taken to include, but not be limited to, solid-state memories, optical medium, and magnetic medium.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for estimating illumination in captured video data, comprising:
    obtaining first video data from a first camera capturing an environment comprising a reflective surface;
    generating a first plurality of radiance samples by geometrically calculating light reflections from the reflective surface, wherein each of the first plurality of radiance samples associates an illumination intensity, a color, and an angular direction of incoming light for a given pixel in the first video data; and
    producing a three-dimensional illumination mapping of the environment captured in the first video data, comprising:
        producing a cubemap of the environment; and
        spatially interpolating the first plurality of radiance samples into each texel of the cubemap by determining an interpolated intensity of each texel from nearby radiance samples of the first plurality of radiance samples using an inverse distance weighting (IDW) function given by:

$$u(x) = \begin{cases} \dfrac{\sum_{i=1}^{N} w_i(x) u_i}{\sum_{i=1}^{N} w_i(x)}, & \text{if } d(x, x_i) \neq 0 \, \forall \, i; \\ u_i, & \text{if } d(x, x_i) = 0 \end{cases}$$

where u is the interpolated intensity of texel x from nearby samples $u_i = u(x_i)$ for $i = 1, 2, \ldots N$.

2. The method of claim 1, wherein generating the first plurality of radiance samples comprises, for each pixel in the first video data:
    projecting a virtual ray from the pixel along a corresponding camera ray into a virtual scene representing the environment;
    if a collision occurs between the virtual ray and the reflective surface, determining where the collision occurs;
    reflecting the virtual ray over a normal of the reflective surface to generate an incoming ray vector; and
    generating one of the first plurality of radiance samples comprising an angle of the incoming ray vector, a color, and an illumination intensity.

3. The method of claim 1, further comprising providing the three-dimensional illumination mapping to an augmented reality engine generating an augmented reality scene based on the environment.

4. The method of claim 3, further comprising dynamically adjusting at least one of a coverage, a resolution, a freshness, or an update interval for providing the three-dimensional illumination mapping as the environment changes over time.

5. A method for estimating illumination in captured video data, comprising:
    obtaining first video data from a first camera capturing an environment comprising a reflective surface, wherein the reflective surface is a known light probe adjacent a positioning marker;
    determining a shape of the reflective surface; and
    geometrically tracking a relative position of the reflective surface and the first camera, comprising estimating a camera position and angle relative to the positioning marker;
    generating a first plurality of radiance samples by geometrically calculating light reflections from the reflective surface; and
    producing a three-dimensional illumination mapping of the environment captured in the first video data by interpolating the first plurality of radiance samples.

6. The method of claim 5, wherein:
    the shape of the reflective surface is inferred from the first video data; and
    geometrically tracking the relative position of the reflective surface and the first camera comprises estimating the relative position based on inferred distances from objects in the environment near the reflective surface.

7. A method for estimating illumination in captured video data, comprising:
    obtaining first video data from a first camera capturing an environment comprising a reflective surface;
    generating a first plurality of radiance samples by geometrically calculating light reflections from the reflective surface;
    obtaining a second plurality of radiance samples based on second video data from a second camera capturing the environment by receiving the second plurality of radiance samples from a nearby mobile device over a network; and
    producing a three-dimensional illumination mapping of the environment captured in the first video data by interpolating the first plurality of radiance samples.

8. The method of claim 7, wherein producing the three-dimensional illumination mapping comprises producing a cubemap of the environment by spatially interpolating the first plurality of radiance samples and the second plurality of radiance samples into each texel of the cubemap.

9. The method of claim 8, wherein spatially interpolating the first plurality of radiance samples and the second plurality of radiance samples comprises:
    weighting each of the first plurality of radiance samples and the second plurality of radiance samples for reliability based on where each radiance sample was captured; and
    determining an interpolated intensity of each texel from nearby radiance samples of the first plurality of radiance samples using an inverse distance weighting (IDW) function where a first radiance sample of the first plurality of radiance samples overrides a second radiance sample of the second plurality of radiance samples having lower reliability.

* * * * *